United States Patent [19]
Sanderford

[11] Patent Number: 5,859,869
[45] Date of Patent: Jan. 12, 1999

[54] LOW COST BINARY PHASE SHIFT KEYING MODULATION TRANSMITTER SYSTEM

[75] Inventor: H. Britton Sanderford, New Orleans, La.

[73] Assignee: Sanconix, Inc., New Orleans, La.

[21] Appl. No.: 559,914

[22] Filed: Nov. 17, 1995

[51] Int. Cl.⁶ .......................... H04B 15/00; H04L 27/20
[52] U.S. Cl. .......................... 375/200; 375/308; 332/104
[58] Field of Search ........................... 375/200, 206, 375/308; 332/103, 104, 105, 146; 380/46

[56] References Cited

U.S. PATENT DOCUMENTS

| | | | |
|---|---|---|---|
| 4,979,183 | 12/1990 | Cowart | 375/206 |
| 5,029,180 | 7/1991 | Cowart | 375/206 |
| 5,119,396 | 6/1992 | Sanderford, Jr. | 375/200 |
| 5,265,120 | 11/1993 | Sanderford, Jr. | 375/200 |
| 5,303,258 | 4/1994 | Nakamura | 375/200 |
| 5,357,541 | 10/1994 | Cowart | 375/206 |

*Primary Examiner*—Don N. Vo
*Attorney, Agent, or Firm*—Joseph T. Regard, Ltd.

[57] ABSTRACT

An improvement in spread spectrum modulator systems, and more particularly further improvements in spread spectrum BPSK, or Binary Phase Shift Keying, Modulation systems, the present invention contemplating the utilization of an exclusive OR logic gate to replace an RF mixer stage in the SS transmitter, thereby providing enhanced gain at a lower energy consumption, with lesser cost and suppressed carrier output when compared to prior systems, as well as compatibility with CMOS low power logic modulation drive circuitry. The present system teaches a new, superior, and less costly BPSK transmitter than contemplated by the prior art, providing a less complicated system while outputting increased gain over prior art modulators.

19 Claims, 3 Drawing Sheets

LOW COST BPSK SPREAD SPECTRUM TRANSMITTER

LOW COST BINARY PHASE SHIFT KEYING MODULATION TRANSMITTER SYSTEM

BACKGROUND OF INVENTION

1. Field of Invention

The present invention relates to modulators, and more particularly to further improvements in spread spectrum BPSK, or Binary Phase Shift Keying Modulation systems, the present invention contemplating a transmitter incorporating therein the utilization of an exclusive OR logic gate to replace an RF mixer stage, thereby providing enhanced gain at a lower energy consumption, with lesser cost and suppressed carrier output when compared to prior systems.

The present system teaches a new, superior, and less costly BPSK transmitter than taught or suggested by the prior art, providing a less complicated system while outputting increased gain over prior art modulator transmitters.

2. Prior Art & General Background

Prior to U.S. Pat. No. 5,265,120, spread spectrum BPSK modulators required conventional balance mixers to produce carrier suppression. These conventional modulators utilized either 1) a complex transistor array in conjunction with a transformer tunable with a potonciometer or 2) two center tapped transformers and four diodes, which arrangement required a high level drive circuit to modulate it, typically +7 to +15 dBM.

Besides the greater expense, increased complexity thereby contributing the probability of failure, and incompatibility with low power −10 dB CMOS logic drive circuitry, the prior art modulators typically produced on the order of six dB of signal loss, resulting in considerably less satisfactory overall performance when compared to the present invention.

The following patents were deemed to be of at least general pertinence to the present invention:

| Patent Number | Issue Date | Inventor | Class |
| --- | --- | --- | --- |
| 4,979,183 | 12/1990 | Cowart | 375-1 |
| 5,029,180 | 7/1991 | Cowart | 375-1 |
| 5,119,396 | 6/1992 | Sanderford, Jr. | 375-1 |
| 5,265,120 | 11/23/93 | Sanderford, Jr. | 375-1 |

U.S. Pat. No. 5,265,120 teaches a prior BPSK spread spectrum transmitter which is compatible in sum respects with the present system. However, '120 does not contemplate the utilization of an exclusive OR logic gate to replace an RF mixer stage in the transmitter in the manner contemplated by the present invention, nor does '120 contemplate the features of FIGS. 5 or 6 of the present invention, nor the discussions relative thereto.

In the "General Summary Discussion of the Invention" section of '120, it was suggested that the '120 system could, in an alternative use, may be utilized as a frequency multiplier. For example, if the transistor, or its equivalent, is adequately fast, for example, F sub t>1 GHZ, the system may be utilized to create at its output a higher frequency harmonic. However, this alternative system, to the extent disclosed, is believed wholly distinguishable from the present, applied for invention, which contemplates a scheme for a complete digital BPSK SS transmitter, and the logic of the modulator in '120 (shown in FIG. 2 of the present application) is clearly distinguishable from that contemplated in the present system, as illustrated in FIGS. 3 and 4 of the present application.

Further, '120 indicates that "it is a common radio design practice to utilize a non-linear device such as a diode, transistor, or the like to perform frequency multiplication. This is desirable because only lower frequency crystals are readily available, and as such, the lower frequency must then be translated into the higher, desired frequency. However, such systems are believed to be distinguishable from the present system, which provides enhanced performance with reduced cost, power consumption, and computational requirements". (Col 2, lines 18–25).

Nonetheless, the prior art has failed to contemplate a new and unique, lower cost BPSK transmitter utilizing an exclusive, in line OR logic gate to replace the RF modulator, or providing a transmitter incorporating a dual gate cascade to modulate the BPSK.

GENERAL, SUMMARY DISCUSSION OF THE INVENTION

The present invention is designed to provide a low cost, efficient, quality and reliable BPSK SS transmitter having a high BPSK modulation rate, without the necessity for a conventional RF mixer stage in the SS transmitter. The present system further provides enhanced gain and frequency multiplication over the prior art, with reduced filtering requirements when compared to prior art systems.

As is known in the art, it is a common radio design practice to utilize a non-linear device such as a diode, transistor, or the like to perform frequency multiplication. This is desirable because only lower frequency crystals are readily available, and as such, the lower frequency must then be translated into the higher, desired frequency. However, the present system is able to accomplish frequency multiplication with less costly hardware and complexity.

The present system is accomplished utilizing certain complimentary metal oxide semiconductor (CMOS) and BiCMOS devices, configuring an exclusive OR logic gate into a dual gate cascade, the A gate configured to achieve a linear mode of operation with harmonic suppression, said gate directly coupled to the B gate via first input in such a manner as to force B gate into linear operation, thereby allowing the chip code modulation to be injected directly on into B gate by via the remaining input. The present configuration has been found to provide symmetrical rise and fall times, believed due to properties of the CMOS devices, thereby providing for rich harmonic output which is filtered, to provide the desired carrier frequency It is thus an object of the present invention to provide a low cost, high quality BPSK modulator compatible for use in spread spectrum-type communications systems.

It is still another object of the present invention to provide a low cost BPSK transmitter which requires less hardware the prior systems, utilizing digital logic gates in order to replace the RF mixer stage, providing enhanced gain and Frequency Multiplication, with reduced filtering requirements.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DESCRIPTION OF THE PREFERRED EXEMPLARY EMBODIMENT(S)

Figure 1:
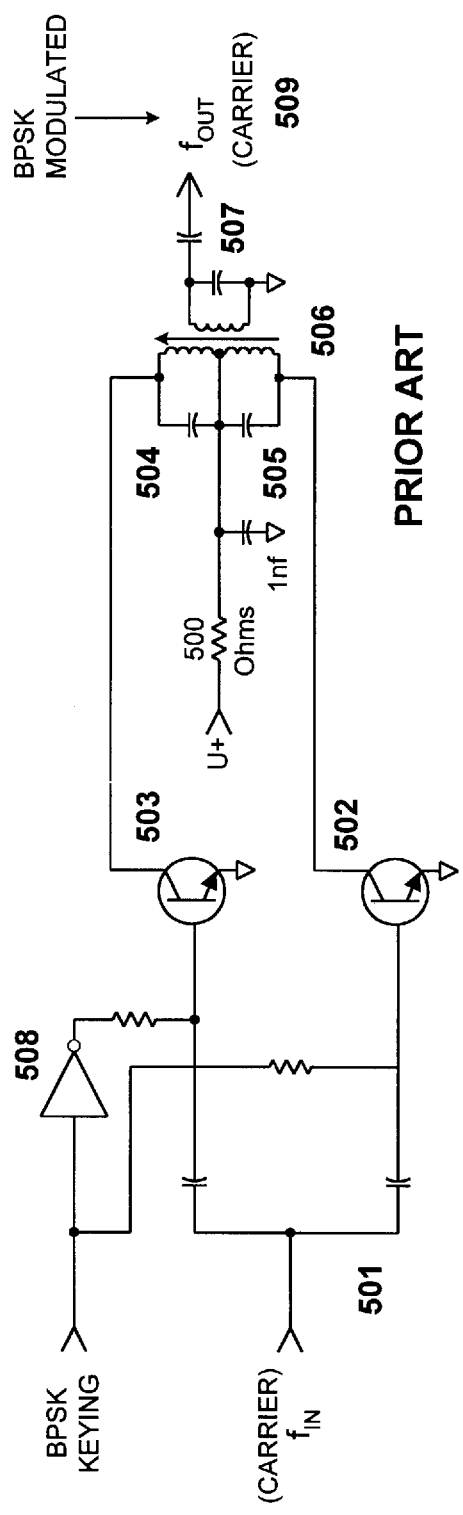
FIG. 1 is a Schematic Illustration of an alternative embodiment of the prior patent BPSK Modulator having transistors precede a phase shifting transformer.

FIG. 1 illustrates a prior published modulation transistor arrangement embodied in U.S. Pat. No. 5,265,120, illustrating a system configured so as to provide frequency modulation in less subsequent stages than the prior art. This serves to lower both the cost and complexity of a frequency multiplier system, when compared to the prior art systems. The contents of U.S. Pat. No. 5,265,120 are hereby incorporated herein by reference.

As shown in FIG. 1, a frequency f sub IN is introduced at 501, so that the frequency f sub IN is AC coupled and present on both transistors 502 and 503. BPSK data is generated in complement via inverter 508, thereby selecting, via base bias resistors, transistors 502 or 503. The collectors are connected via the opposite center tapped primary windings of transformer 506. The center tap provides DC power and AC bypass. The selection of transistor 502 or 503 thereby forces a 0 degree(s) or 180 degree(s) phase relationship on f sub OUT 509. Capacitors 504, 505, and 507 can be used to effect single or double pole filtering depending on the coupling of transformer 506. Frequency multiplication can also be achieved with transistors 502 and 503 by adjusting bias and drive levels for nonlinear output, as well as tuning transformer 506 to the target harmonic.

As further indicated in '120, equivalent devices may be utilized in place of the two transistors in the present invention. These may include high frequency field effect transistors (FET's), or digital logic gates, which are biased into a linear region utilizing common techniques. These devices may be incorporated into the system of the present invention, replacing in effect the transistors, utilizing common engineering techniques.

Figure 2:
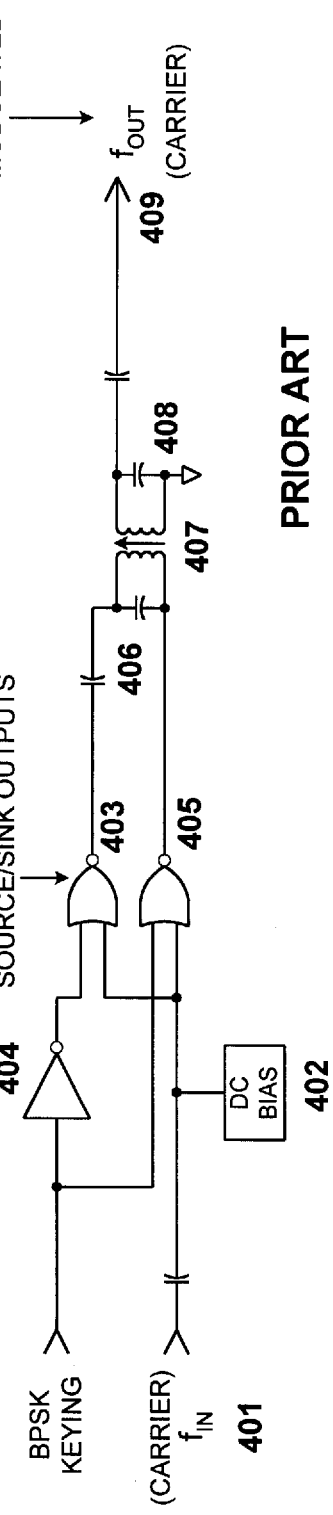
FIG. 2 is a prior patent Schematic Illustration of an alternative embodiment of the prior patent BPSK Modulator replacing transistors with very high speed logic gates.

An additional alternate embodiment of '120, illustrated in FIG. 2, teaches the utilization of very high speed logic gates 403, 405 biased into a linear region and replacing transistors 502, 503 of FIG. 1. As shown in FIG. 2, a frequency is introduced via f sub IN in 401. Bias network means, embodied as a DC bias device 402, is used to force logic elements 403, 405 into a linear region of operation. Either AND gates or OR gates can be made to function in this circuit. The inverter 404 provides complementary BPSK data thereby selecting either gate 403 or gate 405. The outputs then drive the primary of a transformer 407 causing either a 0 degree(s) or a 180 degree(s) phase shift on the output of the transformer 407 at f sub OUT 409. In addition, the transformer 407 can be used as a one or two pole filter in conjunction with capacitors 406, 408, depending on the coupling coefficient of the transformer 407.

Gates 403, 405 can be used as frequency multipliers by adjusting the DC offset and drive levels on the inputs of gates 403, 405, and tuning transformer 407 to the desired harmonic output.

The present invention seeks to further expand on the basic concepts born in '120, providing a low Cost BPSK spread spectrum transmitter, dispensing with the necessity of an RF mixer stage in the spread spectrum transmitter.

Figure 3:
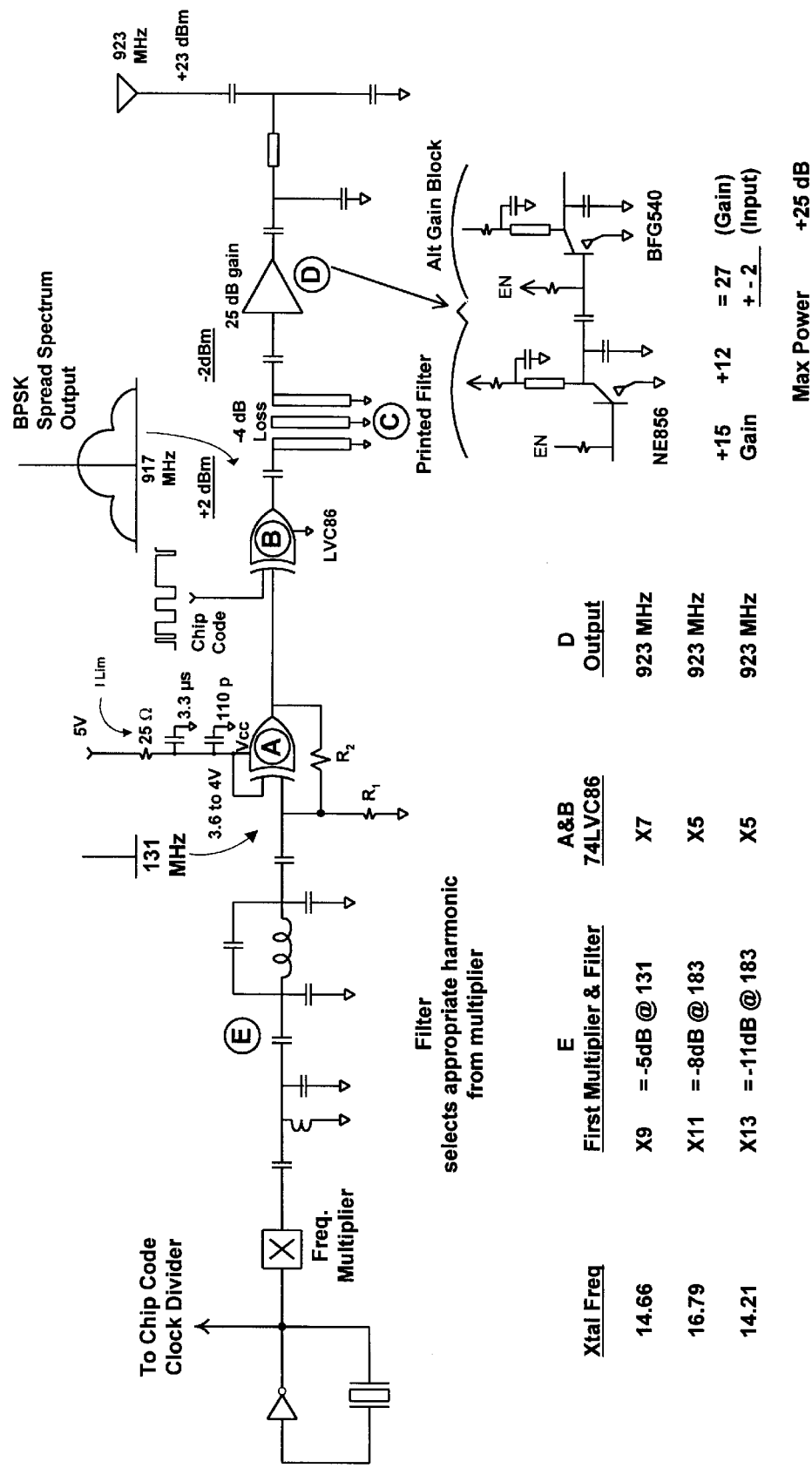
FIG. 3 is a Schematic illustration of the preferred embodiment of the BPSK Spread Spectrum Transmitter of the present invention.

As shown in FIG. 3, the present invention includes the utilization of an exclusive OR logic gate to replace an RF mixer stage in the transmitter, providing gain, frequency multiplication, and reduced filtering requirements.

| Exclusive OR Gate B (Truth Table) | | |
|---|---|---|
| Input (Carrier) | Input (Chip Code) | Output |
| 0 | 0 | 1 |
| 0 | 1 | 0 |
| 1 | 0 | 0 |
| 1 | 1 | 1 |

Note the chip code input inverts the phase of the carrier input when the chip code is in a logic low state. The output is, therefore, the Binary Phase Shift Keyed (BPSK) form of the carrier input whereby the chip code provides the modulation input.

The exclusive OR logic gate is configured into a dual gate cascade. The first gate A, as shown in FIG. 1, is injected with 131 MHz or 183 MHz provided by filter E. It is biased into a linear mode of operation via $R_2$. In order to achieve the linear mode of operation, gate A must be configured as an inverter, therefore, one input is brought to a logic high. The gate A is further made to provide a 50% duty cycle output via $R_1$. A 50% duty cycle causes even harmonic suppression. This relaxes the ±131 MHz or ±183 MHz out-of-band rolloff which must be provided by filter C. The gate A provides ~30 dB+ of gain @ 131 MHz so that an output signal of −5 to −10 dBm will saturate the output of gate A. Since the output of gate A is also in the linear region, as set by $R_1+R_2$, gate A may be directly coupled to gate B. This automatically forces gate B into its linear region of operation. This is possible because gates A and B are both on the same silicon whereby the bias points are nearly identical.

The chip code modulation can then be injected directly on the remaining input of gate B. The resulting output of gate B directly produces BPSK spread spectrum modulation. The rise and fall times of gate B are CMOS and, therefore, symmetrical. CMOS devices, such as '74AC', '74LVC', '74LVT', and BICMOS deliver very fast output rise and fall times. This provides for a rich harmonic output, even in excess of 915 MHz, with suppressed even harmonics.

The fifth harmonic of a 74LVC86 CMOS exclusive OR gate, when driven @ 183 MHz, will yield −2 to +2 dBm of output power @ 923 MHz. The output of gate B is then filtered by a 2 or 3 element strip line filter, C. The filtered output of C yields −2 to −6 dBm of output power. The final gain stage, D, increases the power output to approximately +23 dBm, 200 mW.

Filter E reduces harmonics from the preceding multiplier stage. An initial fundamental crystal frequency of 14.66 MHz, 16.79 MHZ, or 14.21 MHz can provide the desired output frequencies in the 902 to 928 MHz band. This same crystal can be divided and used to provide a chip code clock. This technique phase locks the chip code clock to the carrier frequency.

Figure 4:
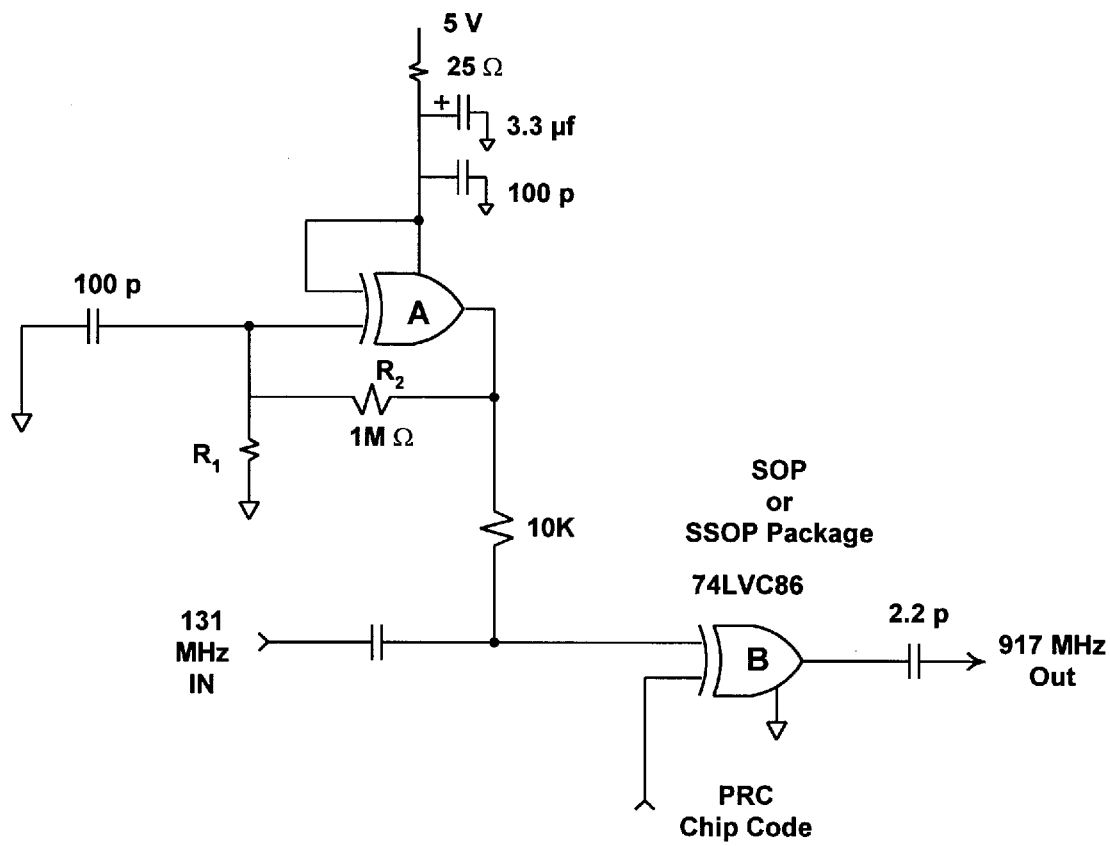
FIG. 4 is a Schematic illustration of an alternative embodiment of the BPSK Spread Spectrum Transmitter of FIG. 3.

Referring to FIG. 4, in the alternative, gate A may be used solely to bias gate B into a linear region of operation. In this case, the input frequency to gate B, 131 MHz or 183 MHz, must be at a higher power +10 to +20 dBm in order to achieve similar output results.

Lastly, the configuration in either FIG. 1 or FIG. 2 can be driven with 102 MHz and the third harmonic may be utilized from the output of gate B. This 306 MHz output may then be tripled to yield a 918 MHz final output frequency.

Once BPSK modulated, only odd harmonics of gate B may be used, or else the spread spectrum output will not be preserved. This technique can be used to provide other higher or lower output frequencies. In addition, other gates, logic arrays, transistor arrays, or transistor configurations may be utilized to accomplish the equivalent functionality.

What is claimed is:

1. A BPSK RF mixer, comprising:
    a first exclusive OR gate A having an output, said gate A biased into a linear mode of operation, providing a linear output signal via said output, and configured to provide an even harmonic suppression;
    a second exclusive OR gate B, said gate B having first and second inputs and an output, said first input coupled to said output of gate A, said second input of gate B configured to receive chip code modulation;
    said first and second exclusive OR gates configured to form a dual gate cascade, wherein said linear output signal of gate A is coupled to said first input of gate B in such a manner as to bias said gate B into a linear mode of operation, and said chip code modulation inputed to said second input of gate B to provide modulation input, allowing said output of said gate B to directly produce BPSK modulation.

2. The BPSK RF mixer of claim 1, wherein said gate A further comprises first and second inputs, said second input brought to a logic high, configuring said gate A as an inverter.

3. The BPSK RF mixer of claim 2, wherein said output of gate A is directed to through a resistor and injected to said first input of said gate A.

4. The BPSK RF mixer of claim 2, wherein said first input of said gate A is injected with a filtered frequency signal via frequency multiplier.

5. The BPSK RF mixer of claim 1, wherein said gates A and B are CMOS.

6. The BPSK RF mixer of claim 1, wherein said output of gate B is filtered by a strip line filter, and is then amplified prior to transmission via antenna or the like.

7. The BPSK RF mixer of claim 5, wherein said gate B is provided by a following group of devices: 74AC, 74LVC, 74LVT, or BICMOS.

8. An RF mixer comprising:
    a first exclusive OR gate A having an output, said gate A biased into a linear mode of operation, providing a linear output signal via said output, and configured to provide an even harmonic suppression;
    a second exclusive OR gate B, said gate B having first and second inputs and an output, said first input coupled to said output of gate A, said first input further receiving a higher power input frequency, said second input of gate B configured to receive chip code modulation;
    said first and second exclusive OR gates configured to urge said gate B into a linear region of operation, wherein said linear output signal of gate A is coupled to said first input of gate B, and said chip code modulation inputed to said second input of gate B to provide modulation input, allowing said output of said gate B to directly produce useable BPSK odd harmonics.

9. The RF mixer of claim 8, wherein said gate A further comprises first and second inputs, said second input brought to a logic high, configuring said gate A as an inverter.

10. The RF mixer of claim 9, wherein said output of gate A is directed to through a resistor and injected to said first input of said gate A.

11. The RF mixer of claim 8, wherein said first input of said gate A is injected with a filtered frequency signal via frequency multiplier.

12. The RF mixer of claim 8, wherein said gates A and B are CMOS.

13. The RF mixer of claim 8, wherein said output of gate B is filtered by a strip line filter, and is then amplified prior to transmission via antenna or the like.

14. The RF mixer of claim 12, wherein said gate B is provided by a device selected from the following group of devices: 74AC, 74LVC, 74LVT, or BICMOS.

15. The RF mixer of claim 12, wherein said gate B is provided by a SOP package comprising a 74LVC86 CMOS device.

16. A method of utilizing digital logic to replace an RF mixer stage in a spread spectrum transmitter, comprising the steps of:
    a. providing a logic gate, comprising:
        a first exclusive OR gate A having an output; and
        a second exclusive OR gate B, said gate B having first and second inputs and an output,
    b. configuring said gate A to provide an even harmonic suppression;
    c. biasing said gate A into a linear mode of operation, such that said output of gate A provides a linear output signal;
    d. configuring said first input of gate B to receive said output of gate A, and configuring said second input of gate B to receive chip code modulation;
    e. forming a dual gate cascade, biasing said gate B into a linear mode of operation utilizing said linear output signal of gate A; and
    f. utilizing said chip code modulation inputed into said second input of gate B to provide modulation input for producing BPSK modulation.

17. A method of utilizing digital logic to replace an RF mixer stage in a spread spectrum transmitter, comprising the steps of:
    a. providing a logic gate, comprising:
        a first exclusive OR gate A having an output; and
        a second exclusive OR gate B, said gate B having first and second inputs and an output,
    b. configuring said gate A to provide an even harmonic suppression;
    c. biasing said gate A into a linear mode of operation, such that said output of gate A provides a linear output signal;
    d. receive said output of gate A via said first input of gate B, while further receiving via said first input of gate B a higher power input frequency;
    e. receiving chip code modulation via said second input of gate B;
    e. forming a dual gate cascade, biasing said gate B into a linear mode of operation utilizing said linear output signal of gate A; and
    f. utilizing said chip code modulation inputed into said second input of gate B to provide modulation input for producing useable BPSK odd harmonics.

18. A method of utilizing digital logic to replace an RF mixer stage in a spread spectrum transmitter, comprising the steps of:
    a. providing a logic gate, comprising:
        a first exclusive OR gate A having an input and an output; and
        a second exclusive OR gate B, said gate B having first and second inputs and an output,
    b. injecting said first input of gate A with a filtered frequency signal via frequency multiplier;

c. configuring said gate A to provide an even harmonic suppression;

d.. biasing said gate A into a linear mode of operation, such that said output of gate A provides a linear output signal;

e. configuring said first input of gate B to receive said output of gate A, and configuring said second input of gate B to receive chip code modulation;

f. forming a dual gate cascade, biasing said gate B into a linear mode of operation utilizing said linear output signal of gate A; and g. utilizing said chip code modulation inputed into said second input of gate B to provide modulation input for producing BPSK modulation, via said output of gate B.

19. A method of utilizing digital logic to replace an RF mixer stage in a spread spectrum transmitter, comprising the steps of:

a. providing a logic gate, comprising:
   a first exclusive OR gate A having an output; and
   a second exclusive OR gate B, said gate B having first and second inputs and an output, b. injecting said first input of gate A with a filtered frequency signal via frequency multiplier;

c. configuring said gate A to provide an even harmonic suppression;

d. biasing said gate A into a linear mode of operation, such that said output of gate A provides a linear output signal;

e. receive said output of gate A via said first input of gate B, while further receiving via said first input of gate B a higher power input frequency;

f. receiving chip code modulation via said second input of gate B;

g. forming a dual cascade, biasing said gate B into a linear mode of operation utilizing said linear output signal of gate A; and h. utilizing said chip code modulation inputed into said second input of gate B to provide modulation input for producing useable BPSK odd harmonics.

* * * * *